United States Patent
Wu et al.

(10) Patent No.: US 12,276,878 B2
(45) Date of Patent: Apr. 15, 2025

(54) DISPLAY SUBSTRATE, MANUFACTURING METHOD THEREOF, DISPLAY PANEL AND DISPLAY DEVICE

(71) Applicant: BOE Technology Group Co., Ltd., Beijing (CN)

(72) Inventors: Huili Wu, Beijing (CN); Wei He, Beijing (CN); Jianjun Zhao, Beijing (CN); Wenqing Xue, Beijing (CN); Renquan Gu, Beijing (CN); Shipei Li, Beijing (CN); Dajun Wang, Beijing (CN); Shi Shu, Beijing (CN); Yong Yu, Beijing (CN); Qi Yao, Beijing (CN); Yun Qiu, Beijing (CN); Guangcai Yuan, Beijing (CN); Xue Dong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/629,773

(22) Filed: Apr. 8, 2024

(65) Prior Publication Data
US 2024/0255792 A1    Aug. 1, 2024

Related U.S. Application Data

(63) Continuation of application No. PCT/CN2022/132543, filed on Nov. 17, 2022.

(51) Int. Cl.
*G02F 1/1335* (2006.01)
*G02B 5/18* (2006.01)

(52) U.S. Cl.
CPC ...... *G02F 1/133504* (2013.01); *G02B 5/1866* (2013.01); *G02F 1/133512* (2013.01); *G02F 1/133514* (2013.01)

(58) Field of Classification Search
CPC .. G02F 1/1339; G02F 1/1341; G02F 1/13394; G02F 2001/13396; G02F 1/1679
See application file for complete search history.

(56) References Cited

U.S. PATENT DOCUMENTS

2011/0013131 A1 * 1/2011 Tanaka ............... G02F 1/13394
445/24
2012/0212701 A1 * 8/2012 Hwang ............... G02F 1/1339
445/24

(Continued)

FOREIGN PATENT DOCUMENTS

| CN | 102998852 A | 3/2013 |
|---|---|---|
| CN | 103207480 A | 7/2013 |

(Continued)

OTHER PUBLICATIONS

Liu, English translation for CN-113608382-A (Year: 2021).*

*Primary Examiner* — Jonathan Y Jung
(74) *Attorney, Agent, or Firm* — IPro, PLLC

(57) ABSTRACT

A display substrate, a method of manufacturing the display substrate, a display panel, and a display device are provided. The display panel includes: an array substrate and an opposite substrate disposed opposite to each other; a liquid crystal layer between the array substrate and the opposite substrate; a first support component on a side of the array substrate facing the liquid crystal layer; and a second support component on a side of the opposite substrate facing the liquid crystal layer. An end portion of a side of the first support component facing away from the array substrate is contacted with an end portion of a side of the second support component facing away from the opposite substrate, and a contact surface has a concave-convex structure.

15 Claims, 12 Drawing Sheets

(56) References Cited

U.S. PATENT DOCUMENTS

2019/0157353 A1* 5/2019 Wang .................. H10K 59/38
2021/0215963 A1* 7/2021 Zhao ................... G02F 1/13394

FOREIGN PATENT DOCUMENTS

| CN | 103439836 A |   | 12/2013 |
|----|-------------|---|---------|
| CN | 203982044 U |   | 12/2014 |
| CN | 105911774 A |   | 8/2016  |
| CN | 205450517 U |   | 8/2016  |
| CN | 106292080 A |   | 1/2017  |
| CN | 110488542 A |   | 11/2019 |
| CN | 113608382 A | * | 11/2021 |
| KR | 20050114123 A |  | 12/2005 |

* cited by examiner

DISPLAY SUBSTRATE, MANUFACTURING METHOD THEREOF, DISPLAY PANEL AND DISPLAY DEVICE

CROSS REFERENCE TO RELATED APPLICATION

This application is a continuation of International Application No. PCT/CN2022/132543 filed Nov. 17, 2022, the entire contents of which are incorporated herein by reference.

TECHNICAL FIELD

The present disclosure relates to the field of display technologies, and in particular to a display substrate, manufacturing method thereof, display panel and display device.

BACKGROUND

Liquid crystal display (LCD) has been widely used because of its small size, low power consumption, and lack of radiation, etc. In order to ensure the stability of the thickness of a liquid crystal layer in the LCD, it is often necessary to arrange a post spacer (PS) between two substrates of the LCD.

Currently, either a design of arranging the spacer on a color film substrate or a design of arranging the spacer on an array substrate is adopted. Regardless of the design, when the strength of the LCD is insufficient, it is very easy to produce non-recoverable color spots, uneven (Mura), light leakage and other undesirable problems after the LCD is hit by an external force. The problems are even more distinct in high-resolution AR products and VR products due to the refined design of the PS.

SUMMARY

The present disclosure provides a display substrate, a method of manufacturing the display substrate, a display panel and a display device, as follows.

Embodiments of the present disclosure provide a display substrate, including:
a base substrate; and
a support component on a side surface of the base substrate.

A side surface of the support component facing away from the base substrate is provided with a concave-convex structure.

Optionally, in the embodiments of the present disclosure, the concave-convex structure includes a grating pattern.

Optionally, in the embodiments of the present disclosure, the grating pattern includes a plurality of bar structures, widths of the plurality of bar structures are equal, and the plurality of bar structures are arranged with an equal spacing between any two of the bar structures.

Optionally, in the embodiments of the present disclosure, the grating pattern includes a plurality of bar structures provided in intersection.

Optionally, in the embodiments of the present disclosure, the concave-convex structure is a groove structure.

Optionally, in the embodiments of the present disclosure, the concave-convex structure is a raised structure.

Optionally, in the embodiments of the present disclosure, the display substrate further includes a blocking component at least partially surrounding the support component.

Correspondingly, embodiments of the present disclosure provide a display panel, including:
an array substrate and an opposite substrate disposed opposite to each other;
a liquid crystal layer between the array substrate and the opposite substrate;
a first support component on a side of the array substrate facing the liquid crystal layer; and
a second support component on a side of the opposite substrate facing the liquid crystal layer.

An end portion of a side of the first support component facing away from the array substrate is contacted with an end portion of a side of the second support component facing away from the opposite substrate, and a contact surface between the end portions has a concave-convex structure.

Optionally, in the embodiments of the present disclosure, the end portion of the side of the first support component facing away from the array substrate has a grating pattern, and the end portion of the side of the second support component facing away from the opposite substrate has a grating pattern, and the grating patterns constitute the concave-convex structure.

Optionally, in the embodiments of the present disclosure, the grating pattern includes a plurality of bar structures, widths of the plurality of bar structures are equal, and the plurality of bar structures are arranged with an equal spacing between any two of the bar structures.

Optionally, in the embodiments of the present disclosure, the grating pattern includes a plurality of bar structures provided in intersection.

Optionally, in the embodiments of the present disclosure, the end portion of the side of the first support component facing away from the array substrate is provided with a groove structure, and the end portion of the side of the second support component facing away from the opposite substrate is provided with a raised structure, and the raised structure is embedded with the groove structure.

Optionally, in the embodiments of the present disclosure, the second support component has a trapezoidal cross-sectional shape along a thickness direction. A length of a bottom edge of the cross-sectional shape in contact with the opposite substrate is greater than a length of a top edge. The end portion of one side of the first support component facing away from the array substrate is provided with a groove structure. The end portion of the side of the second support component facing away from the opposite substrate is embedded with the groove structure.

Optionally, in the embodiments of the present disclosure, the end portion of the side of the second support component facing away from the opposite substrate is provided with a groove structure, the end portion of the side of the first support component facing away from the array substrate is provided with a raised structure, and the raised structure is embedded with the groove structure.

Optionally, in the embodiments of the present disclosure, the opposite substrate includes a base substrate, a plurality of color filters on the base substrate, and a light shielding component between two adjacent color filters.

Orthographic projections of the first support component and the second support component on the opposite substrate both entirely fall within a region of an orthographic projection of the light shielding component on the opposite substrate.

Optionally, in the embodiments of the present disclosure, the array substrate further includes a blocking component at least partially surrounding the first support component, and the blocking component has a thickness greater than a thickness of the first support component.

Optionally, in the embodiments of the present disclosure, a material of the first support component is at least one of Mo, Al, Ti, and Cu; and a material of the second support component is at least one of Mo, Al, Ti, and Cu.

Optionally, in the embodiments of the present disclosure, the second support component includes a first metal layer, a second metal layer, and a first resin layer between the first metal layer and the second metal layer.

Optionally, in the embodiments of the present disclosure, the second support component includes a third metal layer and a second resin layer, and the third metal layer is provided in contact with the opposite substrate.

Correspondingly, embodiments of the present disclosure provide a display device, including: the display panel according to any one of the above display panels.

Correspondingly, embodiments of the present disclosure provide a method of manufacturing the display substrate according to any one of the above display substrates, including:
  forming a whole support layer on a side surface of the base substrate; and
  patterning a side surface of the support layer facing away from the base substrate, to form a pattern of the support component at a target location of the base substrate.

Optionally, in the embodiments of the present disclosure, the patterning the side surface of the support layer facing away from the base substrate, to form the pattern of the support component at the target location of the base substrate, includes:
  rasterizing the side surface of the support layer facing away from the base substrate at the target location by a first patterning process to form a plurality of bar structures provided with an equal width and arranged at an equal spacing; and
  exposing other portions of the support layer at a location other than the target location by a second patterning process to form the pattern of the support component including the plurality of bar structures at the target location.

Optionally, in the embodiments of the present disclosure, the patterning the side surface of the support layer facing away from the base substrate, to form the pattern of the support component at the target location of the base substrate, includes:
  forming a pattern of the support layer by a third patterning process, wherein the support layer has a first thickness at the target location and a second thickness greater than the first thickness at a location other than the target location; and
  exposing other portions of the support layer at the location other than the target location by a fourth patterning process to form the pattern of the support component including a groove structure at the target location.

DETAILED DESCRIPTION

In order to make the objects, technical solutions and advantages of the embodiments of the present disclosure clearer, the technical solutions of the embodiments of the present disclosure will be described clearly and completely in the following in conjunction with the accompanying drawings of the embodiments of the present disclosure. Obviously, the described embodiments are a part of the embodiments of the present disclosure and not all of the embodiments. And the embodiments and the features in the embodiments of the present disclosure can be combined with each other without conflict. Based on the described embodiments of the present disclosure, all other embodiments obtained by a person of ordinary skill in the art without creative labor are within the protection scope of the present disclosure.

Unless otherwise defined, technical terms or scientific terms used in the present disclosure shall have the ordinary meaning understood by a person of ordinary skill in the field to which the present disclosure belongs. The word "including" or "comprising" and the like as used in the present disclosure are intended to mean that the components or objects appearing in front of the word encompass the components or objects appearing in the enumeration following the word and their equivalents, and do not exclude other components or objects.

In the related art, with the continuous pursuit of high resolution of a display in the AR product and VR product, the refined design and production process is an inevitable trend in the development of the display, and the design and production process will also have a direct impact on the final product. Further, substantial changes in ambient temperature and product hit by an external force will also have an impact on the display of the product. Therefore, the requirements for the production of the panel and display effect will continue to improve. At present, AR products and VR products either use a design of spacers set on a color film substrate, or a design of spacers set on an array substrate. In both designs, spacer-related Mura, light leakage and other problems due to the assembly box offset exist. Here, PS Mura occurs mainly due to an external force on the LCD. When the strength of the LCD is insufficient, it is very easy to produce irrecoverable color spots after the LEC is hit by an external force, thereby leading to PS Mura.

As the resolution continues to increase, for example, 2000 PPI (Pixels Per Inch, pixel density), in order to ensure the light effect, the thickness of the liquid crystal box in the LCD is getting smaller and smaller. In order to meet the requirements for the light effect and further avoid PS Mura, it is necessary to develop a high-fine PS.

In view of this, embodiments of the present disclosure provide a display substrate, a method of manufacturing the display substrate, a display panel, and a display device for avoiding a PS Mura problem and improving a display effect.

Figure 1:
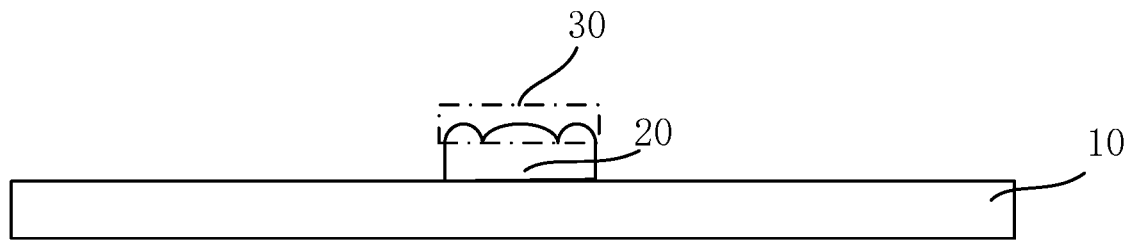
FIG. 1 shows a schematic diagram of one of structures of a display substrate provided by embodiments of the present disclosure.

As shown in FIG. 1, a display substrate is provided in the embodiments of the present disclosure. The display substrate includes:

a base substrate 10, and a support component 20 on a side surface of the base substrate 10.

Here, a side surface of the support component 20 facing away from the base substrate 10 is provided with a concave-convex structure 30.

In implementations, the display substrate provided by the embodiments of the present disclosure includes the base substrate 10 and the support component 20 on a side surface of the base substrate 10. Here, the base substrate 10 may be a flexible substrate or a rigid substrate, which is not limited herein. In an exemplary embodiment, the display substrate may be an array substrate. In an exemplary embodiment, the display substrate may be a color film substrate. Moreover, a side surface of the support component 20 facing away from the base substrate 10 is provided with the concave-convex structure 30. Accordingly, the side surface of the support component 20 facing away from the base substrate 10 is a non-planar surface. In this way, the area of the side surface of the support component 20 facing away from the base substrate 10 in contact with other components is increased, thereby improving the stable force between the support component 20 and other components.

In the embodiments of the present disclosure, the concave-convex structure 30 may be provided in the following ways, but is not limited to the following ways.

Figure 2:
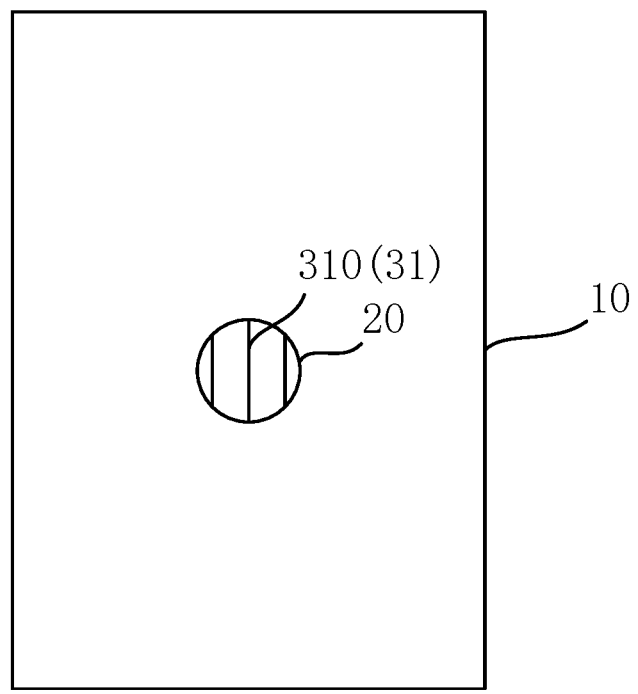
FIG. 2 shows a schematic diagram of one of top view structures of a support component in FIG. 1.
Figure 3:
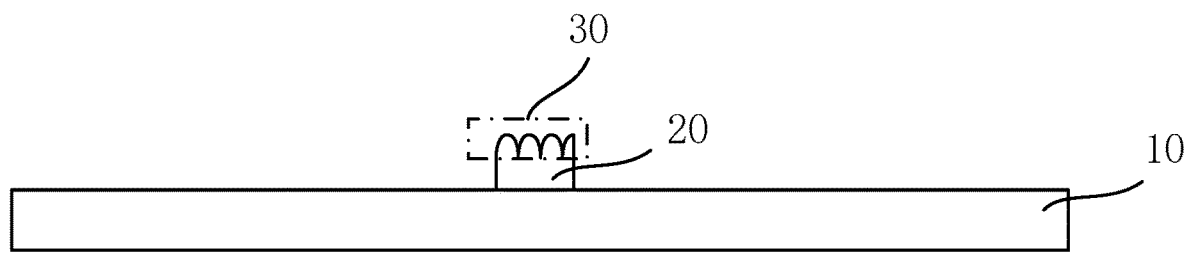
FIG. 3 shows a schematic diagram of one of sectional structures of the support component in FIG. 1.

In an exemplary embodiment, shown in conjunction with FIGS. 2 and 3, the concave-convex structure 30 includes a grating pattern 31. Here, FIG. 2 shows a schematic diagram of one of top view structures of the display substrate, and FIG. 3 shows a schematic diagram of one of sectional structures of the support component 20.

In an exemplary embodiment, still shown in conjunction with FIG. 2, the grating pattern includes a plurality of bar structures 310, and the bar structures 310 each is provided with an equal width and are arranged at an equal spacing. In an implementation process, the quantity of the plurality of bar structures 310 may be set according to actual application needs, and is not limited herein. In addition, a ratio of the width to the spacing in the plurality of bar structures 310 is greater than or equal to 1 µm. The specific width of each bar structure 310 and the spacing between two adjacent bar structures 310 may be set according to actual application needs, and is not limited herein.

Figure 4:
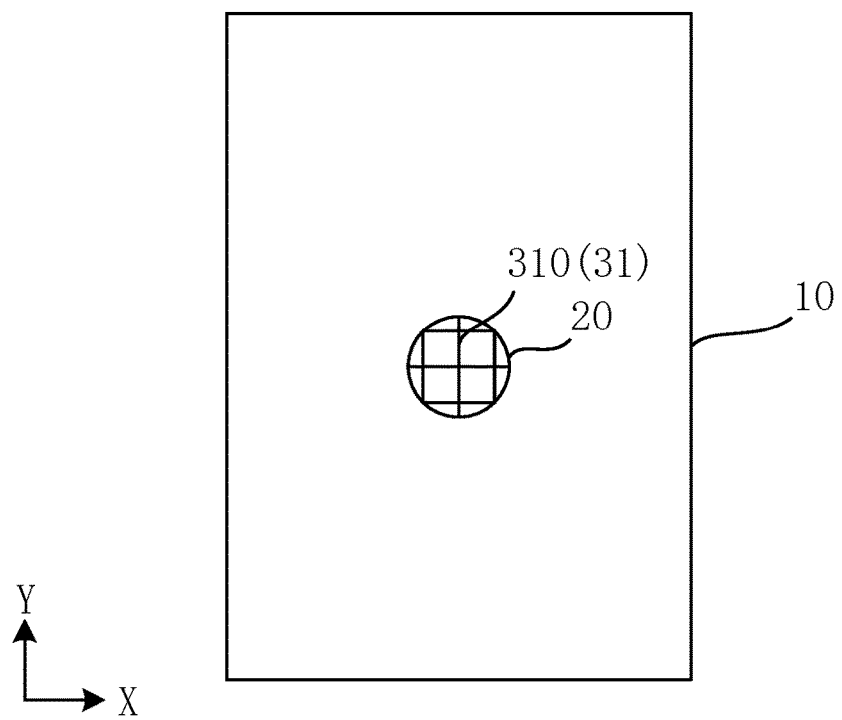
FIG. 4 shows a schematic diagram of one of the top view structures of the support component in FIG. 1.

In an exemplary embodiment, as shown in FIG. 4, FIG. 4 shows a top view structure of the support component 20. Specifically, the grating pattern 31 includes a plurality of bar structures 310 provided in intersection. Still shown in conjunction with FIG. 4, the grating pattern 31 includes a plurality of bar structures 310 along a first direction, and a plurality of bar structures 310 along a second direction. The second direction is intersected with the first direction. Here, the direction shown by the arrow X is the first direction, and the direction shown by the arrow Y is the second direction.

Figure 5:
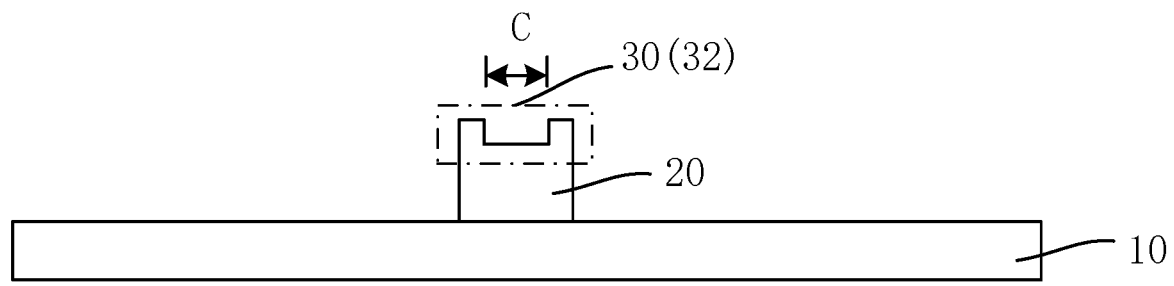
FIG. 5 shows a schematic diagram of one of the structures of the display substrate provided by embodiments of the present disclosure.

In an exemplary embodiment, FIG. 5 shows a schematic diagram of one of the structures of the display substrate. Specifically, the concave-convex structure 30 is a groove structure 32. Here, an extension width of the groove structure 32 along a direction perpendicular to a thickness direction is greater than or equal to 1.5 µm. The extension width is shown as label C in FIG. 5.

Figure 6:
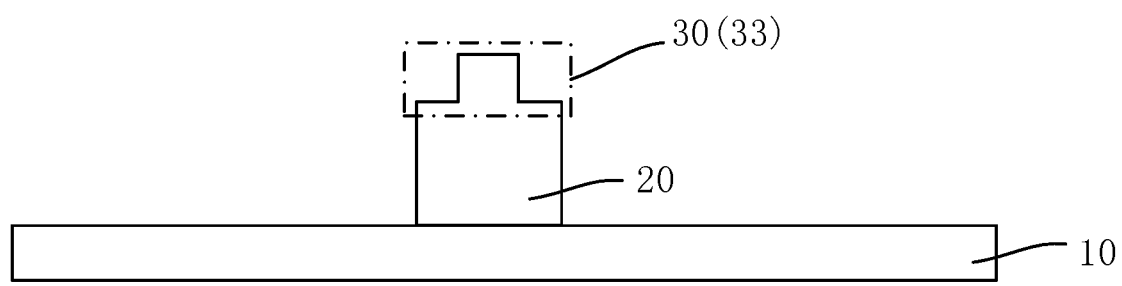
FIG. 6 shows a schematic diagram of one of the structures of the display substrate provided by embodiments of the present disclosure.

In an exemplary embodiment, FIG. 6 shows a schematic diagram of one of the structures of the display substrate. Specifically, the concave-convex structure 30 is a raised structure 33.

It should be noted that the concave-convex structure 30 may be other structures in addition to those mentioned above. For example, the concave-convex structure 30 includes a plurality of groove structures 32. For another example, the concave-convex structure 30 includes a plurality of raised structures 33. In this way, a diversified design of the display substrate is ensured while guaranteeing a stable force between the support component 20 and other components.

Figure 7:
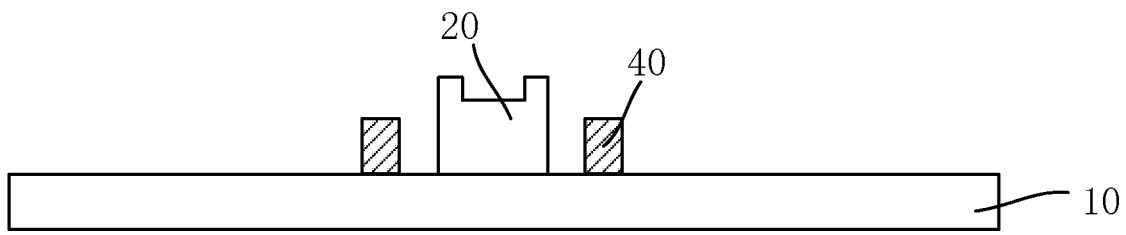
FIG. 7 shows a schematic diagram of one of the structures of the display substrate provided by embodiments of the present disclosure.

In an embodiment of the present disclosure, FIG. 7 shows a schematic diagram of one of sectional structures of the display substrate. Specifically, the display substrate further includes a blocking component 40 that at least partially surrounds the support component 20. In the exemplary embodiment shown in FIG. 7, the display substrate includes a blocking component 40 that completely surrounds the support component 20. Here, the blocking component 40 is spaced apart from the support component 20 by a predetermined distance, and a value of the predetermined distance may be determined according to actual application needs and is not limited herein. In this way, even if an external force acts on the display substrate, the blocking component 40 may effectively prevent the display substrate from being subjected to a force process that exceeds a limit, thereby ensuring the usability of the display substrate.

It should be noted that the quantity of support components 20 may one, two, or even three or more, and the quantity of support components 20 may be set according to the needs of the actual applications, and is not limited herein.

Figure 8:
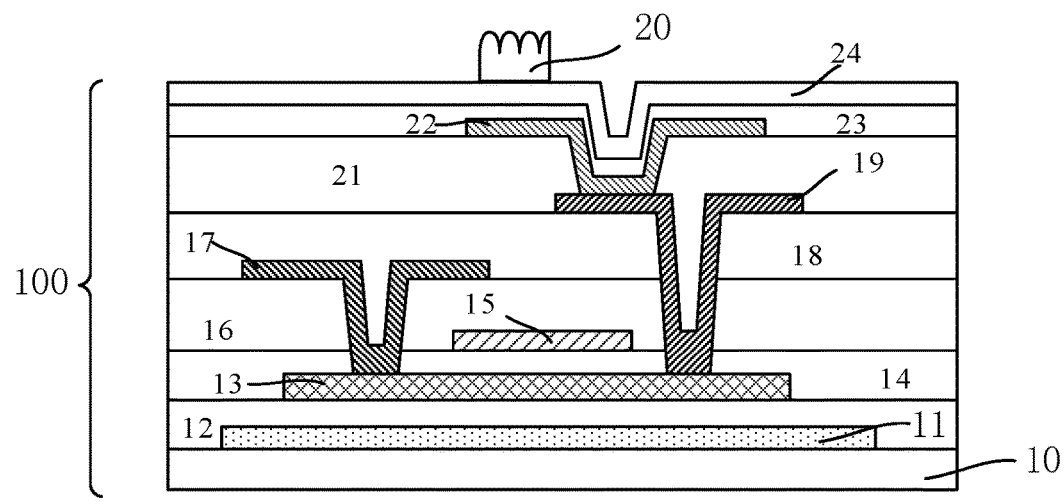
FIG. 8 shows a schematic diagram of one of the structures of the display substrate provided by embodiments of the present disclosure.

Furthermore, in an exemplary embodiment, as shown in FIG. 8, the display substrate is an array substrate 100. The array substrate 100 may further include a light shielding layer 11, a buffer layer 12, an active layer 13, a gate insulating layer 14, a gate layer 15, a first interlayer insulating layer 16, a first source drain electrode layer 17, a second interlayer insulating layer 18, a second source drain electrode layer 19, a planarization layer 21, a pixel electrode layer 22, a passivation layer 23, and a common electrode layer 24. The support component 20 is on a side of the common electrode layer facing away from the base substrate 10. Of course, in addition to the relevant film layers mentioned above, other film layers may also be provided in the array substrate according to the actual application needs, and will not be limited herein. In addition, when the display substrate is an array substrate, the blocking component 40 may be prepared by retaining a portion of the patterns of the gate layer 15, the second interlayer insulating layer 18, and the second source drain electrode layer 19 at the corresponding locations, which will not be described in detail herein.

Figure 9:
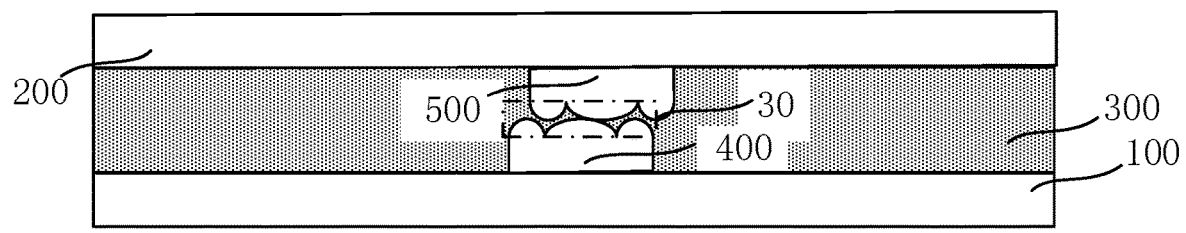
FIG. 9 shows a schematic diagram of one of structures of a display panel provided by embodiments of the present disclosure.

Based on the same disclosure idea, as shown in FIG. 9, embodiments of the present disclosure provide a display panel, including:

an array substrate 100 and an opposite substrate 200 disposed opposite to each other;

a liquid crystal layer 300 between the array substrate 100 and the opposite substrate 200;

a first support component 400 on a side of the array substrate 100 facing the liquid crystal layer 300; and a second support component 500 on a side of the opposite substrate 200 facing the liquid crystal layer 300.

An end portion of a side of the first support component 400 facing away from the array substrate 100 is contacted with an end portion of a side of the second support component 500 facing away from the opposite substrate 200, and a contact surface has a concave-convex structure 30.

In implementations, the display panel provided in the embodiments of the present disclosure includes the array substrate 100 and the opposite substrate 200 disposed opposite to each other, and the liquid crystal layer 300 between the array substrate 100 and the opposite substrate 200. The first support component 400 is disposed on a side of the array substrate 100 facing the liquid crystal layer 300, and the second support component 500 is disposed on a side of the opposite substrate 200 facing the liquid crystal layer 300. The end portion of a side of the first support component 400 facing away from the array substrate 100 is contacted with the end portion of a side of the second support component 500 facing away from the opposite substrate 200, and the contact surface has the concave-convex structure 30. In this way, when the end portion of a side of the first support component 400 facing away from the array substrate 100 is contacted with the end portion of a side of the second support component 500 facing away from the opposite substrate 200, due to the concave-convex structure 30 of the contact surface, the structural stability between the first support component 400 and the second support component 500 is ensured, thereby ensuring the structural stability between the array substrate 100 and the opposite substrate 200, avoiding the Mura problem and improving the display effect of the display panel.

In the embodiments of the present disclosure, shown in conjunction with FIGS. 10 to 19, the first support component 400 and the second support component 500 may be provided in the following ways, but are not limited to the following ways.

Figure 10:
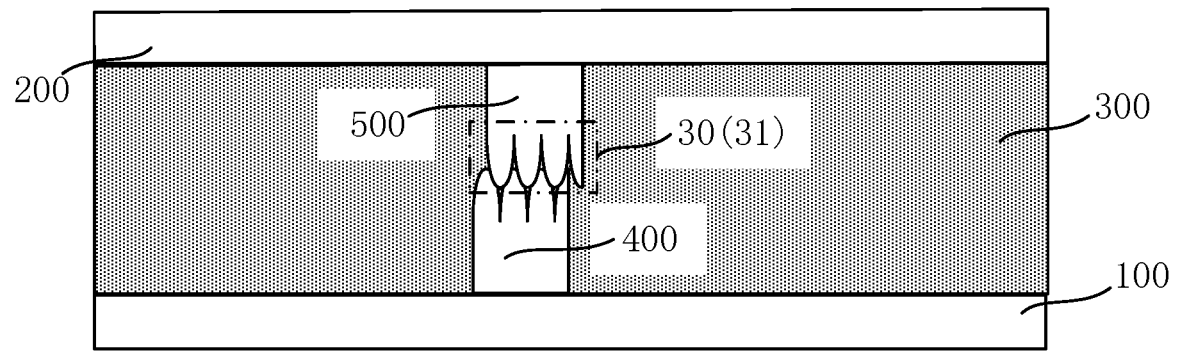
FIG. 10 shows a schematic diagram of one of the structures of the display panel provided by embodiments of the present disclosure.

In an exemplary embodiment, still shown in conjunction with FIG. 10, a grating pattern 31 is provided in both the end portion of the side of the first support component 400 facing away from the array substrate 100 and the end portion of the side of the second support component 500 facing away from the opposite substrate 200, and the grating patterns 31 constitute the concave-convex structure 30.

Figure 11:
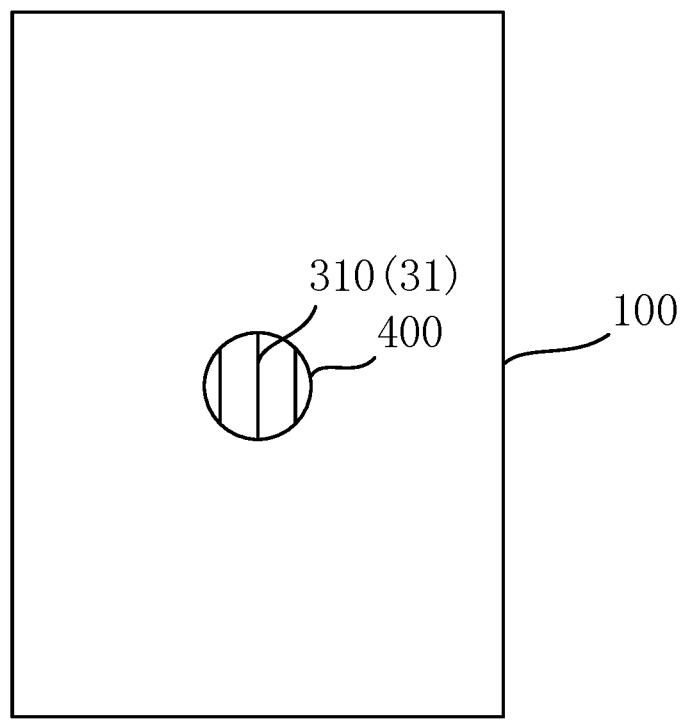
FIG. 11 shows a schematic diagram of one of top view structures of a first support component in FIG. 10.

In an exemplary embodiment, FIG. 11 shows a schematic diagram of one of the top view structures of the first support component 400 in FIG. 10. The grating pattern 31 includes a plurality of bar structures 310, and the bar structures 310 each is provided with an equal width and are arranged at an equal spacing. For the relevant structural parameters of the plurality of bar structures 310, such as, for example, a width, spacing, quantity, etc., they can be set according to the actual application needs, and are not limited herein.

Figure 12:
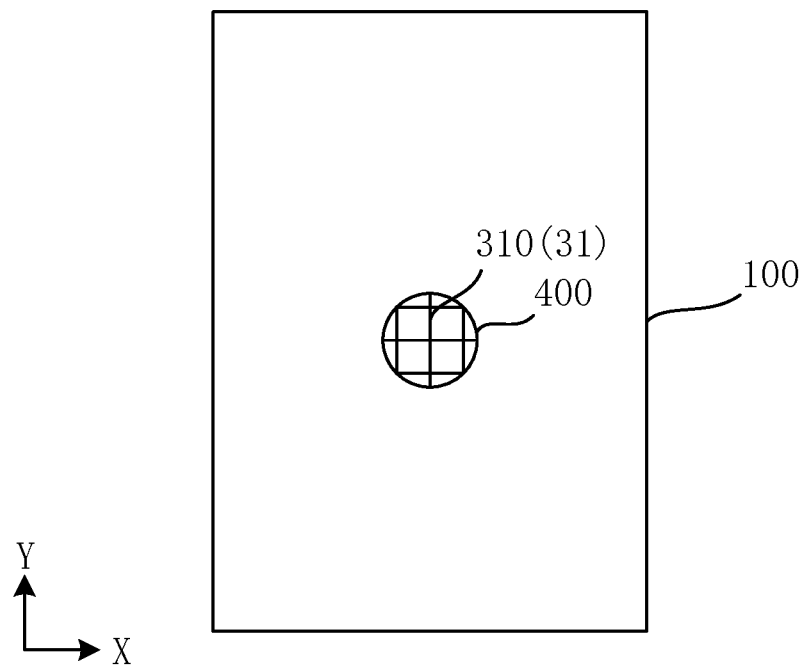
FIG. 12 shows a schematic diagram of one of the top view structures of the first support component in FIG. 10.

In an exemplary embodiment, FIG. 12 shows a schematic diagram of one of the top view structures of the first support component 400 in FIG. 10. The grating pattern 31 includes a plurality of bar structures 310 provided in intersection. In the exemplary embodiment, the grating pattern 31 includes a plurality of bar structures 310 extending along a first direction, and a plurality of bar structures 310 extending along a second direction. The second direction is intersected with the first direction 310. The direction shown by the arrow X is the first direction and the direction shown by the arrow Y is the second direction. For the relevant structural parameters of the plurality of bar structures 310 extending along the first direction, such as, a width, spacing, quantity, etc., they can be set according to the actual application needs, and are not limited herein. For the relevant structural parameters of the plurality of bar structures 310 extending along the second direction, such as, a width, spacing, quantity, etc., they can be set according to the actual application needs and are not limited herein.

Figure 13:
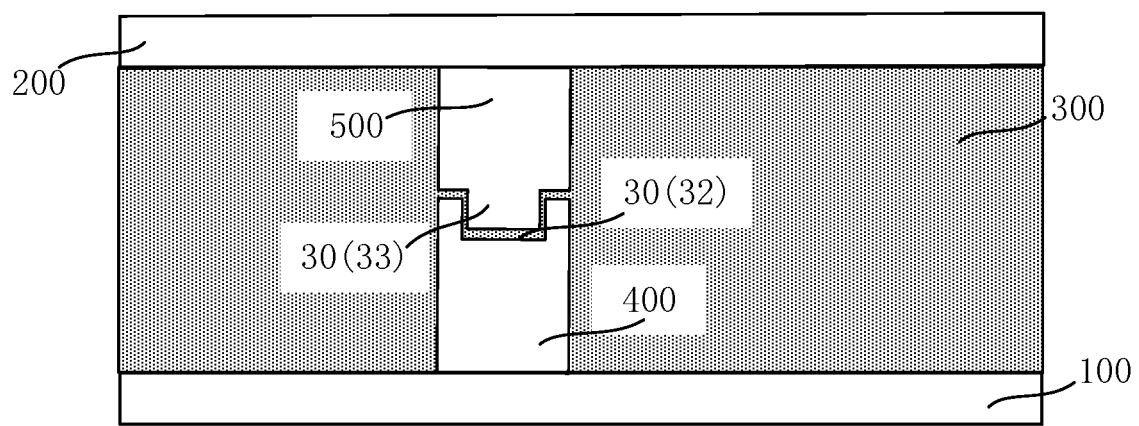
FIG. 13 shows a schematic diagram of one of the structures of the display panel provided by embodiments of the present disclosure.

In an embodiment of the present disclosure, as shown in FIG. 13, the end portion of a side the first support component 400 facing away from the array substrate 100 is provided with a groove structure 32. The end portion of a side of the second support component 500 facing away from the opposite substrate 200 is provided with a raised structure 33. The raised structure 33 is embedded with the groove structure 32.

In the exemplary embodiment shown in FIG. 13, the end portion of the side of the first support component 400 facing away from the array substrate 100 is provided with the groove structure 32. At the corresponding location, the end portion of the side of the second support component 500 facing away from the opposite substrate 200 is provided with the raised structure 33. The raised structure 33 can be embedded with the groove structure 32. In this way, due to the strong embedding force between the raised structure 33 and the groove structure 32, the stability between the first support component 400 and the second support component 500 is improved, thereby improving the display effect of the display panel.

Figure 14:
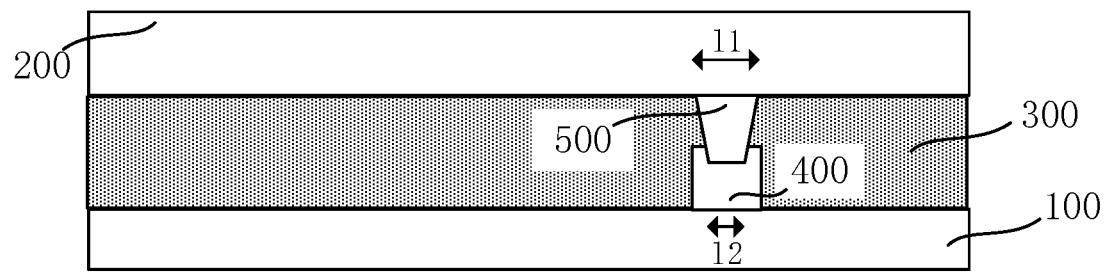
FIG. 14 shows a schematic diagram of one of the structures of the display panel provided by embodiments of the present disclosure.

In an embodiment of the present disclosure, as shown in FIG. 14, the second support component 500 has a trapezoidal cross-sectional shape along a corresponding thickness direction, and a length of a bottom edge of the cross-sectional shape in contact with the opposite substrate 200 is greater than a length of a top edge. The end portion of a side of the first support component 400 facing away from the array substrate 100 is provided with a groove structure 32. The end portion of the side of the second support component 500 facing away from the opposite substrate 200 is embedded with the groove structure 32.

In the exemplary embodiment shown in FIG. 14, the second support component 500 has a trapezoidal cross-sectional shape along a corresponding thickness direction. A length of the bottom edge of the cross-sectional shape in contact with the opposite substrate 200 is greater than a length of the top edge. Here, l1 denotes the length of the bottom edge, l2 denotes the length of the top edge, and l1 is greater than l2. Furthermore, the end portion of the side of the first support component 400 facing away from the array substrate 100 is provided with a groove structure 32. The end portion of the side of the second support component 500 facing away from the opposite substrate 200 is embedded with the groove structure 32. In this way, while taking into account the structural stability of the second support component 500, the embedded effect between the end portion of the side of the second support component 500 facing away from the opposite substrate 200 and the groove structure 32 ensures the stability between the first support component 400 and the second support component 500, and improves the display effect of the display panel.

Figure 15:
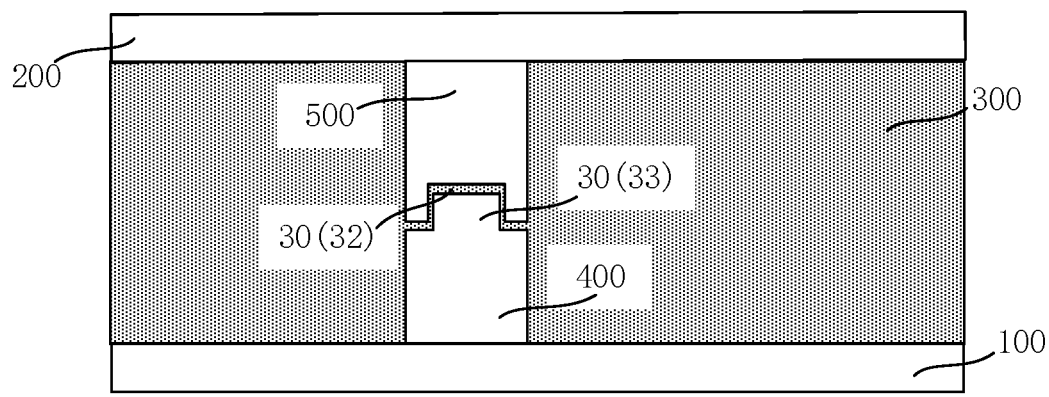
FIG. 15 shows a schematic diagram of one of the structures of the display panel provided by embodiments of the present disclosure.

In an embodiment of the present disclosure, as shown in FIG. 15, the end portion of the side of the second support component 500 facing away from the opposite substrate 200 is provided with a groove structure 32. The end portion of the side of the first support component 400 facing away from the array substrate 100 is provided with a raised structure 33. The raised structure 33 is embedded with the groove structure 32.

In the exemplary embodiment shown in FIG. 15, the end portion of the side of the second support component 500 facing away from the opposite substrate 200 is provided with a groove structure 32. At a corresponding location, the end portion of the side of the first support component 400 facing away from the array substrate 100 is provided with a raised structure 33. The raised structure 33 can be embedded with the groove structure 32 at the corresponding location, thereby ensuring the stability between the first support component 400 and the second support component 500 and improving the display effect of the display panel.

Figure 16:
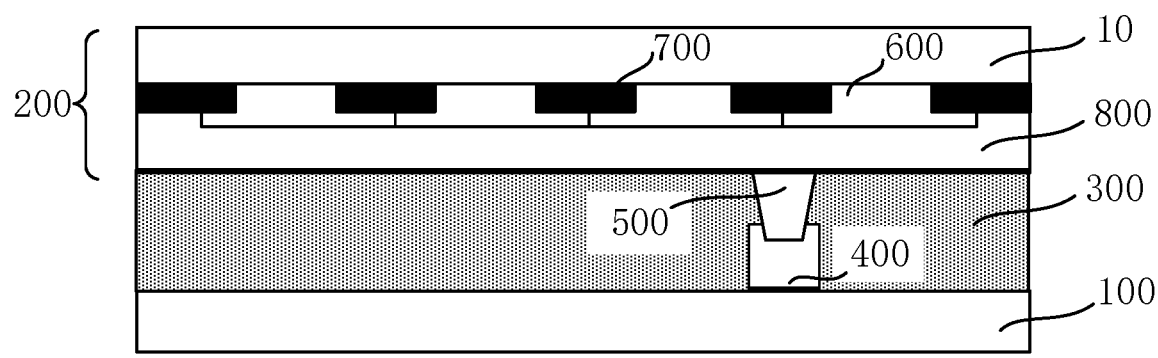
FIG. 16 shows a schematic diagram of one of the structures of the display panel provided by embodiments of the present disclosure.

In an embodiment of the present disclosure, as shown in FIG. 16, the opposite substrate 200 includes a base substrate 10, a plurality of color filters 600 on the base substrate 10, and a light shielding component 700 between two adjacent color filters 600. Orthographic projections of the first support component 400 and the second support component 500 on the opposite substrate 200 both entirely fall within a region of an orthographic projection of the light shielding component 700 on the opposite substrate 200.

In the exemplary embodiment shown in FIG. 16, the opposite substrate 200 includes a base substrate 10, a plurality of color filters 600 on the base substrate 10, and a light shielding component 700 between two adjacent color filters 600. The plurality of color filters 600 include a plurality of red color filters 600, a plurality of green color filters 600, and a plurality of blue color filters 600, so as to ensure the display effect of the display panel. The quantity of the plurality of red color filters 600, the plurality of green color filters 600, and the plurality of blue color filters 600 may be set according to the actual application needs, and is not limited herein. In addition, the light shielding component 700 provided between two adjacent color filters may be a black matrix (BM), which avoids the phenomenon of light mixing between the adjacent color filters 600 and ensures the display effect of the display panel. In an implementation, the orthographic projections of the first support component 400 and the second support component 500 on the opposite substrate 200 fall completely within the region of the orthographic projection of the light shielding component 700 on the opposite substrate 200. In this way, the support performance of the first support component 400 and the second support component 500 is taken into account while ensuring the opening ratio of the display panel. It should be noted that the first support component 400 and the second support component 500 may be made as large as possible according to the actual setting of the light shielding component 700, thereby ensuring the structural stability of the display panel. In addition, a planarization layer 800 (Over Coater, OC) is provided between the plurality of color filters 600 and the second support component 500, thereby ensuring the structural stability of the second support component 500.

In embodiments of the present disclosure, the array substrate 100 further includes a blocking component 40 at least partially surrounding the first support component 400.

Figure 17:
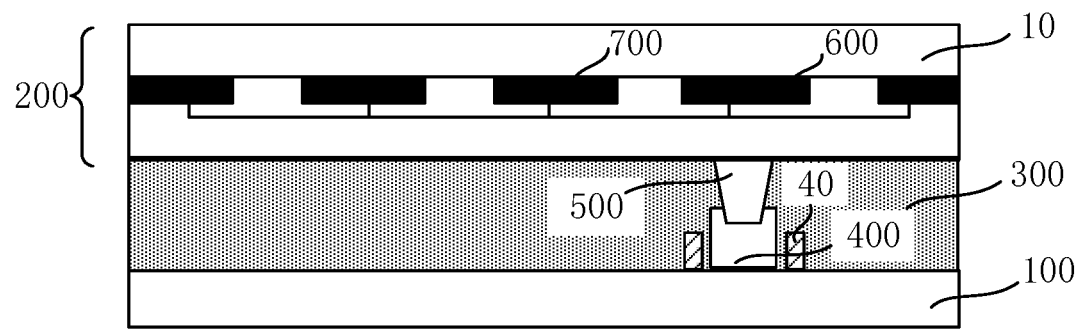
FIG. 17 shows a schematic diagram of one of the structures of the display panel provided by embodiments of the present disclosure.

In the exemplary embodiment shown in FIG. 17, the array substrate 100 further includes a blocking component 40 surrounding the first support component 400. The blocking component 40 is spaced apart from the first support component 400 by a predetermined distance. In an implementation, the value of the predetermined distance may be set according to the distance at which the sliding between the first support component 400 and the second support component 500 occurs due to an external force, which is not limited herein. In this way, even if an external force acts on the display panel, the blocking component 40 may effectively prevent the display panel from exceeding the limit of the force process, thereby ensuring the usability of the display panel. In addition, the orthographic projection of the blocking component 40 on the opposite substrate 200 falls completely within a region of the orthographic projection of the light shielding component 700 on the opposite substrate 200. In this way, the display effect of the display panel is taken into account while preventing the force between the first support component 400 and the second support component 500 from being exceeded.

It should be noted that the quantity of the first support components 400 is not limited to one, but may be two, or even three or more, and the quantity of the first support components 400 may be set according to the needs of the actual application, and is not limited herein. Accordingly, the second support component(s) 500 is/are provided in one-to-one correspondence with the first support component(s) 400. For example, the quantity of the second support component(s) 500 equal to the quantity of the first support component(s) 400.

In an embodiment of the present disclosure, the materials of the first support component 400 and the second support component 500 are at least one of Mo, Al, Ti and Cu.

In an implementation, the first support component 400 and the second support component 500 may be made of pure metal. In an exemplary embodiment, the materials of the first support component 400 and the second support component 500 are at least one of Mo, Al, Ti, and Cu. In order to ensure the elastic recovery performance of the display panel while taking into account the support performance of the first support component 400 and the second support component 500, one of the first support component 400 and the second support component 500 is made of a metal material and the other one is made of a resin material.

Figure 18:
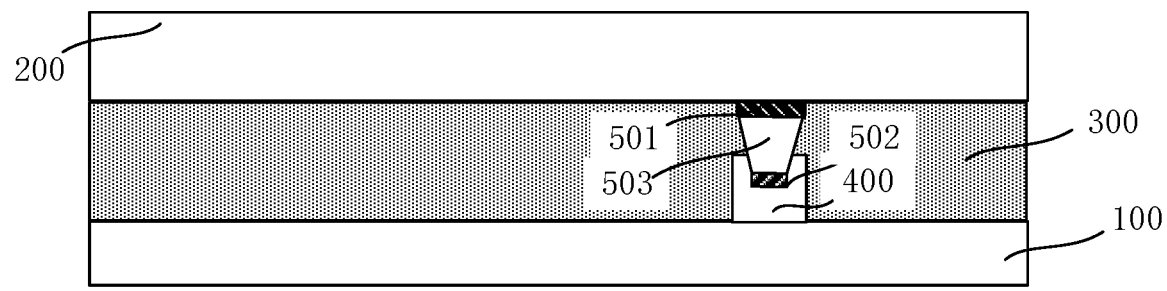
FIG. 18 shows a schematic diagram of one of the structures of the display panel provided by embodiments of the present disclosure.

In an embodiment of the present disclosure, as shown in FIG. 18, the second support component 500 includes a first metal layer 501, a second metal layer 502, and a first resin layer 503 between the first metal layer 501 and the second metal layer 502. Here, the first metal layer 501 is disposed in contact with the opposite substrate 200.

Figure 19:
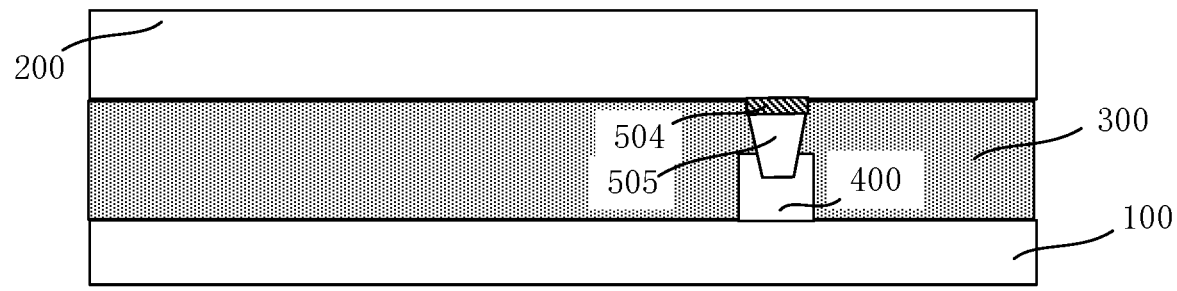
FIG. 19 shows a schematic diagram of one of the structures of the display panel provided by embodiments of the present disclosure.

In an embodiment of the present disclosure, as shown in FIG. 19, the second support component 500 includes a third metal layer 504 and a second resin layer 505, and the third metal layer 504 is provided in contact with the opposite substrate 200.

It should be noted that, the materials of the first metal layer 501, the second metal layer 502 and the third metal layer 504 may be at least one of Mo, Al, Ti and Cu. The materials of the first resin layer 503 and the second resin layer 505 may be polyimide (PI), and may also be acrylic (PMMA). Of course, the materials of the metal layer and the resin layer may also be set according to the actual application needs, and will not be limited herein.

Based on the same disclosure idea, embodiments of the present disclosure also provide a display device, including: a display panel as described in any one of the above embodiments.

In implementations, the display device solves problems in a similar principle as the aforementioned display panel. Therefore, the implementation of the display device may be referred to the implementation of the aforementioned display panel, and the repetition will not be repeated.

In implementations, the display device provided by the embodiments of the present disclosure may be a cell phone, a tablet computer, a television, a display, a laptop computer, a digital photo frame, a navigator, and any other product or component with a display function. Other essential components of the display device should be understood by a person of ordinary skill in the art, and are not described herein, nor should they be used as a limitation to the present disclosure.

It should be noted that the display device provided in the embodiments of the present disclosure may also be a VR product or an AR product, even if it is of high resolution, e.g., 2000 PPI. Since the end portion of a side of the first support component 400 facing away from the array substrate 100 is contacted with the end portion of a side of the second support component 500 facing away from the opposite substrate 200, and the contact surface has a concave-convex structure 30, the array substrate 100 and the opposite substrate 200 have a strong embedding force therebetween, and the structural stability of the display device is better. The first support component 400 and the second support component 500 may be made finer under the premise of a limited liquid crystal box thickness, thereby improving the usability of the display device.

Figure 20:
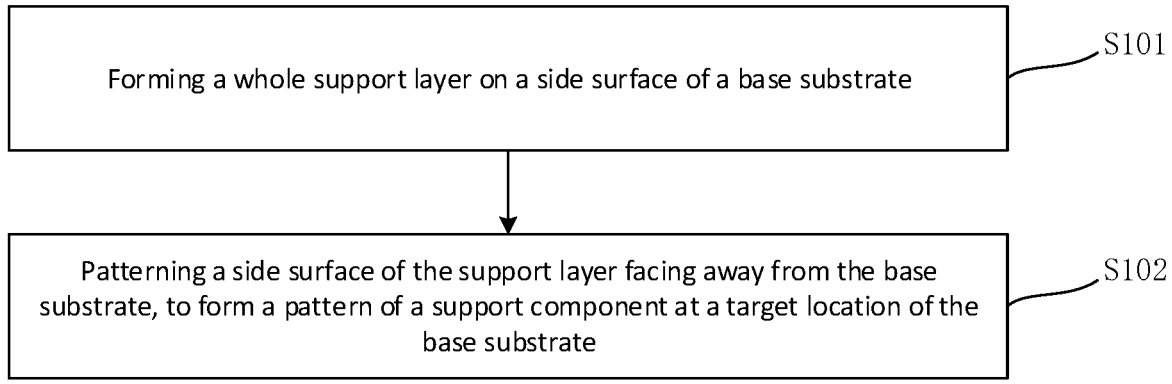
FIG. 20 shows a method flowchart of a method of manufacturing a display substrate provided by embodiments of the present disclosure.

Based on the same disclosure idea, as shown in FIG. 20, embodiments of the present disclosure provide a method of manufacturing a display substrate as described in any one of the foregoing. The method includes:
S101: forming a whole support layer on a side surface of the base substrate;
S102: patterning a side surface of the support layer facing away from the base substrate, to form a pattern of the support component at a target location of the base substrate.

In implementations, the realization process of S101 to S102 is as follows.

First, a whole support layer 201 is formed on a side surface of the base substrate 10. In an exemplary embodiment, the material of the support layer 201 is a resin material, and the whole support layer 201 of the resin material is formed by coating on the side surface of the base substrate 10. Then, a side surface of the support layer 201 facing away from the base substrate 10 is patterned, to form a pattern of the support component 20 at a target location of the base substrate 10, thereby forming a concave-convex structure 30 on a side surface of the support component 20 facing away from the base substrate 10. Here, the target location may be set according to the actual application needs.

Figure 21:
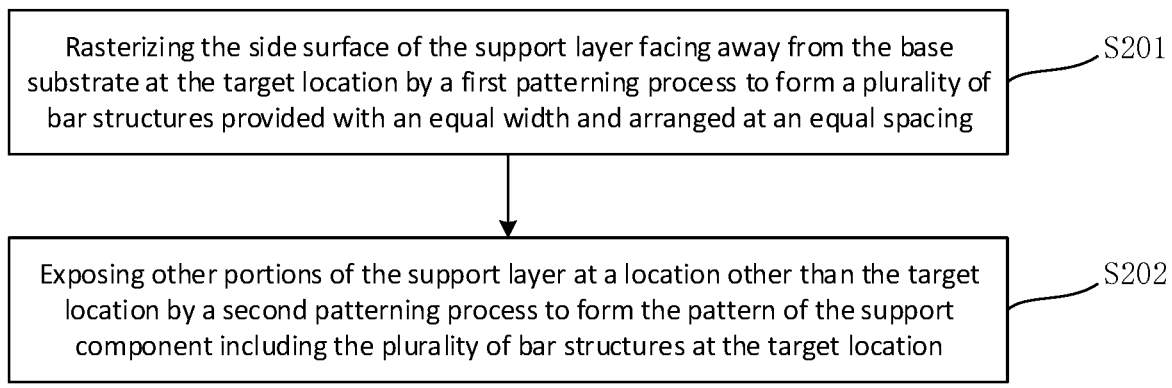
FIG. 21 shows a method flowchart of S102 in FIG. 20.

In the embodiments of the present disclosure, in an exemplary embodiment, shown in conjunction with FIG. 21, S102: the patterning the side surface of the support layer facing away from the base substrate, to form the pattern of the support component at the target location of the base substrate, includes:
S201: rasterizing the side surface of the support layer facing away from the base substrate at the target location by a first patterning process to form a plurality of bar structures provided with an equal width and arranged at an equal spacing;
S202: exposing other portions of the support layer at a location other than the target location by a second patterning process to form the pattern of the support component including the plurality of bar structures at the target location.

In implementations, the realization process of S201 to S202 is as follows.

Figure 22:
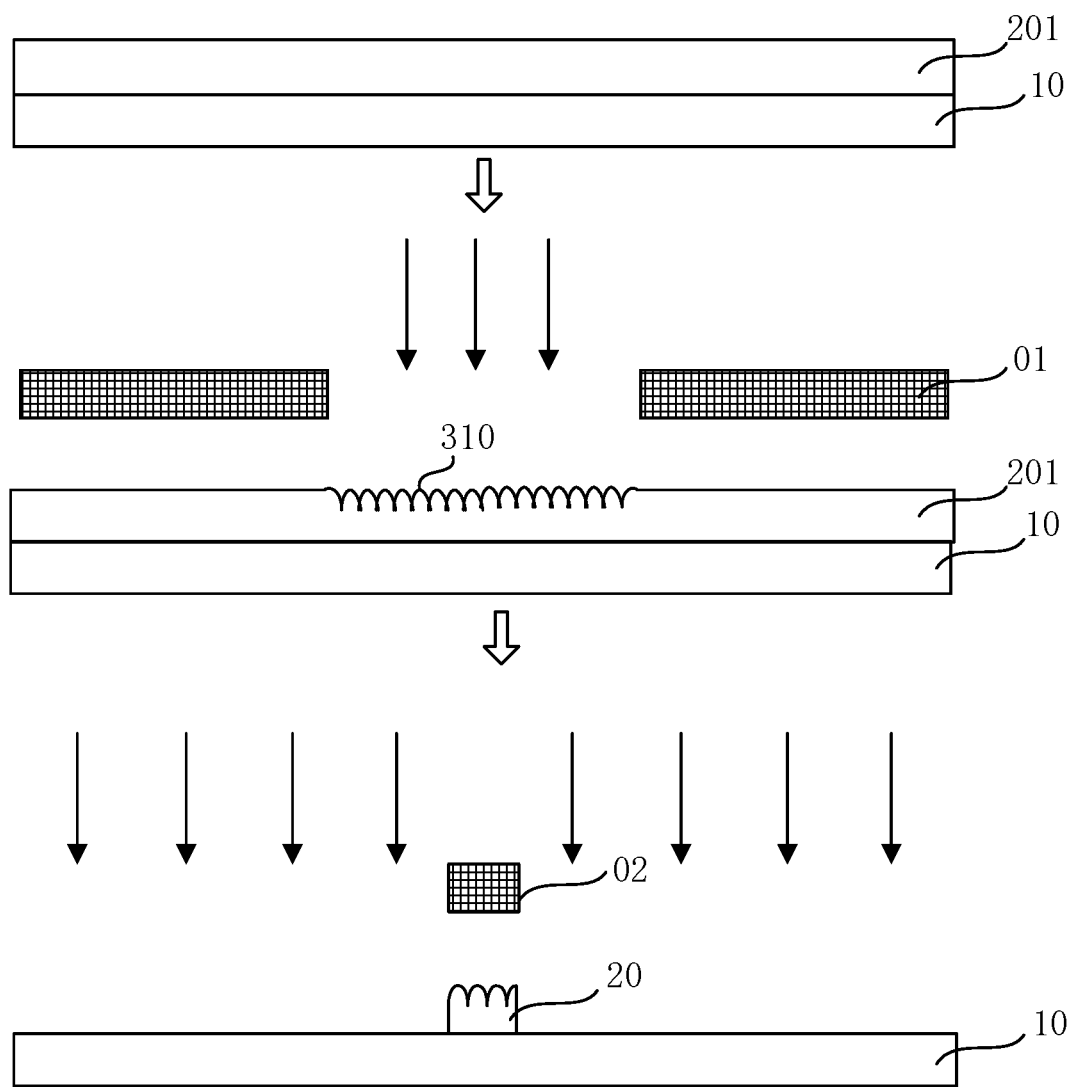
FIG. 22 shows a process flow diagram corresponding to FIG. 21.

First, a first patterning process is used to rasterize a side surface of the support layer 201 facing away from the base substrate 10 at the target location to form a plurality of bar structures 310 provided with an equal width and arranged at an equal spacing. For example, a low-energy UV (Ultraviolet) light is used to rasterize the side surface of the support layer 201 facing away from the base substrate 10 at the target location, to form a plurality of bar structures 310 provided with an equal width and arranged at an equal spacing. Then, a second patterning process is used to expose other portions of the support layer 201 at a location other than the target location. Then, developing and post-baking are performed to form a pattern of the support component 20 including the plurality of bar structures 310 at the target location. For example, a high-energy UV light is used to expose other portions of the support layer 201. The value ranges of the low energy and the high energy may be set according to the actual material of the support layer 201 and the actual thickness of the support layer 201. For example, if the thickness of the support layer 201 is 0.8 μm, the energy required to expose the support layer 201 is greater than or equal to 80 mJ, and the range of the low energy may be 30 mJ to 50 mJ. The corresponding process flow diagrams of S201 to S202 are shown in FIG. 22, in which 01 and 02 denote two different mask plates, respectively.

Figure 23:
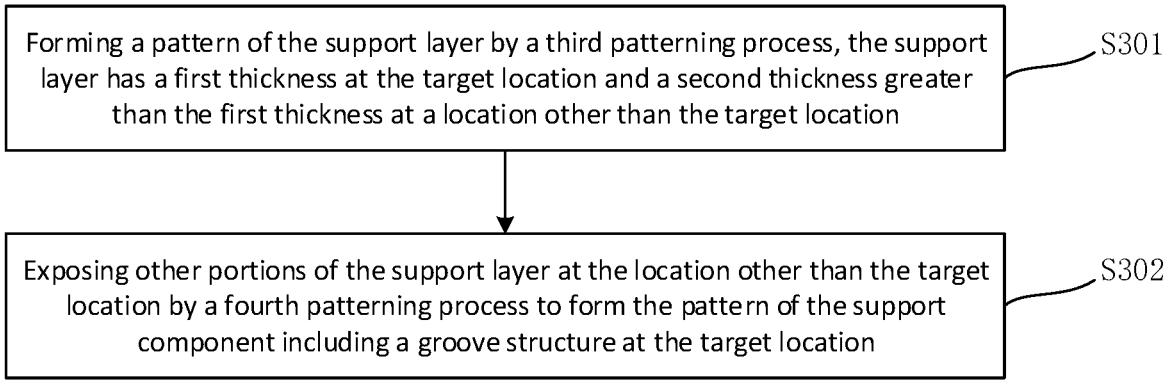
FIG. 23 shows a method flowchart of S102 in FIG. 20.

In an embodiment of the present disclosure, in an exemplary embodiment, as shown in FIG. 23, S102: the patterning the side surface of the support layer facing away from the base substrate, to form the pattern of the support component at the target location of the base substrate, includes:
S301: forming a pattern of the support layer by a third patterning process, here the support layer has a first thickness at the target location and a second thickness at a location other than the target location, and the second thickness is greater than the first thickness;
S302: exposing other portions of the support layer at the location other than the target location by a fourth patterning process, to form the pattern of the support component including a groove structure at the target location.

Figure 24:
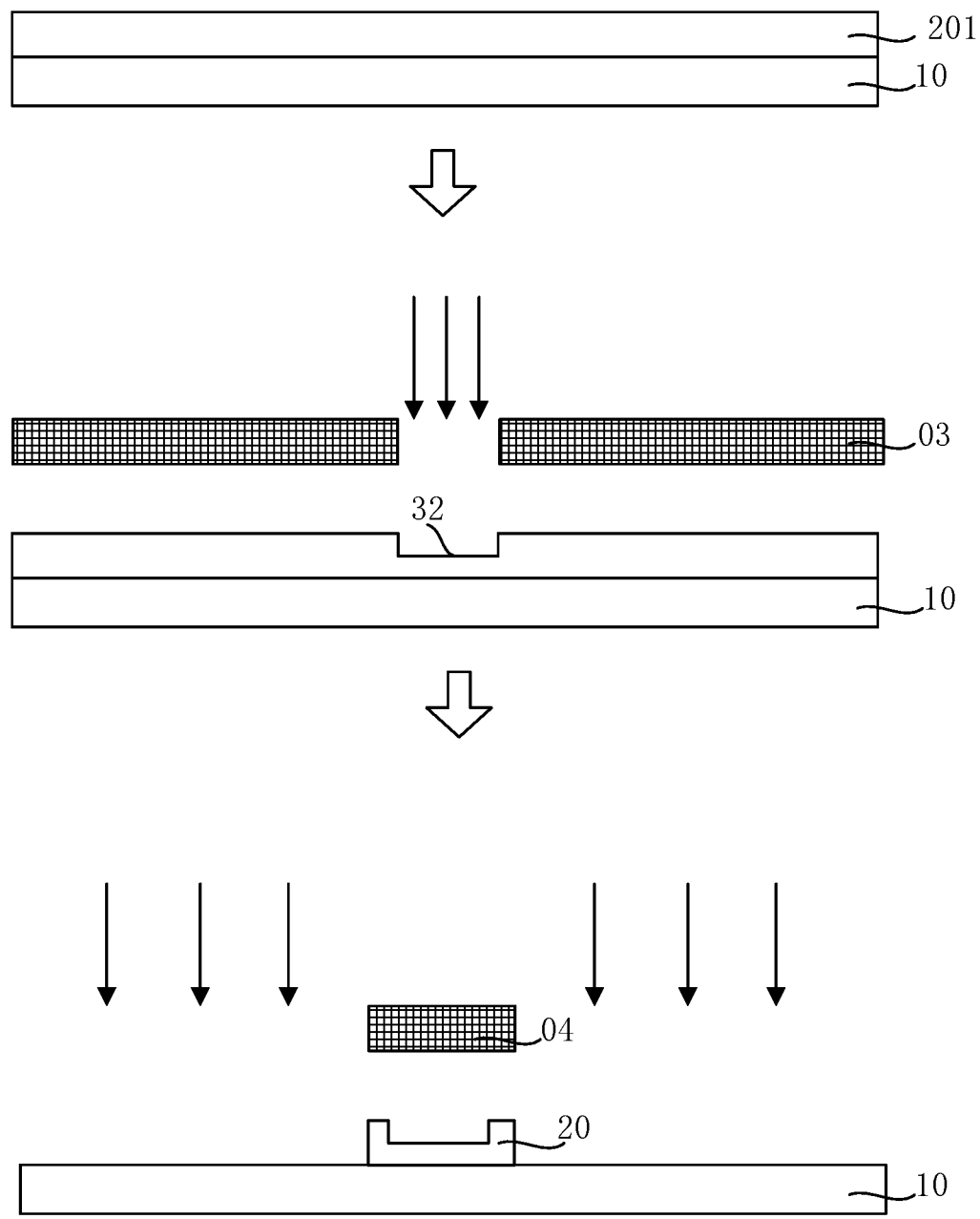
FIG. 24 shows a process flow diagram corresponding to FIG. 23.

First, a third patterning process is used to form a pattern of the support layer 201. For example, a low-energy UV light is used to dig the side surface of the support layer 201 facing away from the base substrate 10 at the target location to form the groove structure 32. The support layer 201 has a first thickness at the target location and a second thickness greater than the first thickness at a location other than the target location. Then, a fourth patterning process is used to expose other portions of the support layer 201 at the location other than the target location. Then developing and post-baking is performed to form a pattern of the support component 20 including a groove structure 32 at the target location. For example, a high-energy UV light is used to expose other portions of the support layer 201. The value ranges of the low energy and the high energy may be set according to the actual material of the support layer 201 and the actual thickness, and are not limited herein. The corresponding process flow diagrams of S301 to S302 are shown in FIG. 24. Here, the labels 03 and 04 denote two different mask plates, respectively.

It should be noted that the display substrate may be the array substrate 100, and may also be the opposite substrate 200. The process of manufacturing the support component 20 on the array substrate 100, and the process of manufacturing the support component 20 on the opposite substrate 200 are substantially the same, and will not be described in detail herein. In addition, the display substrate may also be manufactured using a relevant manufacturing process according to the actual application needs, which will not be described in detail herein.

Although preferred embodiments of the present disclosure have been described, those skilled in the art may make additional changes and modifications to these embodiments once the basic inventive concepts are known. Therefore, the appended claims are intended to be construed to include the preferred embodiments as well as all changes and modifications that fall within the scope of the present disclosure.

Obviously, those skilled in the art can make various changes and variations to the present disclosure without departing from the spirit and scope of the present disclosure. Thus, to the extent that such modifications and variations of the present disclosure fall within the scope of the present claims and their technical equivalents, the present disclosure is intended to encompass such modifications and variations.

What is claimed is:

1. A display panel, comprising:
    an array substrate and an opposite substrate disposed opposite to each other;
    a liquid crystal layer between the array substrate and the opposite substrate;
    a first support component on a side of the array substrate facing the liquid crystal layer; and
    a second support component on a side of the opposite substrate facing the liquid crystal layer;
    wherein an end portion of a side of the first support component facing away from the array substrate is contacted with an end portion of a side of the second support component facing away from the opposite substrate, and a contact surface between the end portions has a concave-convex structure;
    wherein the second support component comprises:
       a first metal layer,
       a second metal layer, and
       a first resin layer between the first metal layer and the second metal layer;
    or
       a third metal layer, and
       a second resin layer,
       wherein the third metal layer is provided in contact with the opposite substrate.

2. The display panel according to claim 1, wherein a grating pattern is provided in both the end portion of the side of the first support component facing away from the array substrate and the end portion of the side of the second support component facing away from the opposite substrate, and the grating pattern constitutes the concave-convex structure.

3. The display panel according to claim 2, wherein the grating pattern comprises a plurality of bar structures, widths of the plurality of bar structures are equal, and the plurality of bar structures are arranged with an equal spacing between any two of the bar structures.

4. The display panel according to claim 2, wherein the grating pattern comprises a plurality of bar structures provided in intersection.

5. The display panel according to claim 1, wherein the end portion of the side of the first support component facing away from the array substrate is provided with a groove structure, and the end portion of the side of the second support component facing away from the opposite substrate is provided with a raised structure, and the raised structure is embedded with the groove structure.

6. The display panel according to claim 1, wherein the second support component has a trapezoidal cross-sectional shape along a thickness direction, a length of a bottom edge of the cross-sectional shape in contact with the opposite substrate is greater than a length of a top edge, the end portion of the side of the first support component facing away from the array substrate is provided with a groove structure, and the end portion of the side of the second support component facing away from the opposite substrate is embedded with the groove structure.

7. The display panel according to claim 1, wherein the end portion of the side of the second support component facing away from the opposite substrate is provided with a groove structure, the end portion of the side of the first support component facing away from the array substrate is provided with a raised structure, and the raised structure is embedded with the groove structure.

8. The display panel according to claim 1, wherein the opposite substrate comprises:
    a base substrate,
    a plurality of color filters on the base substrate, and
    a light shielding component between two adjacent color filters,
    wherein orthographic projections of the first support component and the second support component on the opposite substrate both entirely fall within a region of an orthographic projection of the light shielding component on the opposite substrate.

9. The display panel according to claim 8, wherein the array substrate further comprises a blocking component at least partially surrounding the first support component.

10. The display panel according to claim 9, wherein a thickness of the blocking component is smaller than a thickness of the first support component.

11. A display device, comprising:
    the display panel according to claim 1.

12. A method of manufacturing the array substrate or the opposite substrate in the display panel according to claim 1, comprising:
    forming a whole support layer on a side surface of the array substrate or the opposite substrate; and
    patterning a side surface of the whole support layer facing away from the array substrate or the opposite substrate, to form a pattern of the first support component or the second support component at a target location of the array substrate or the opposite substrate.

13. The method according to claim 12, wherein said patterning the side surface of the whole support layer facing away from the array substrate or the opposite substrate, to form the pattern of the first support component or the second support component at the target location of the array substrate or the opposite substrate, comprises:
- rasterizing the side surface of the whole support layer facing away from the array substrate or the opposite substrate at the target location by a first patterning process to form a plurality of bar structures provided with an equal width and arranged at an equal spacing; and
- exposing other portions of the whole support layer at a location other than the target location by a second patterning process to form the pattern of the first support component or the second support component including the plurality of bar structures at the target location.

14. The method according to claim 12, wherein said patterning the side surface of the whole support layer facing away from the array substrate or the opposite substrate, to form the pattern of the first support component or the second support component at the target location of the array substrate or the opposite substrate, comprises:
- forming a pattern of the whole support layer by a third patterning process, wherein the whole support layer has a first thickness at the target location and a second thickness greater than the first thickness at a location other than the target location; and
- exposing other portions of the whole support layer at the location other than the target location by a fourth patterning process to form the pattern of the first support component or the second support component including a groove structure at the target location.

15. The display panel according to claim 1, wherein the concave-convex structure is a groove structure or a raised structure.

* * * * *